No. 718,350. PATENTED JAN. 13, 1903.
W. HOFFERT.
CULTIVATOR ATTACHMENT.
APPLICATION FILED AUG. 14, 1902.
NO MODEL.
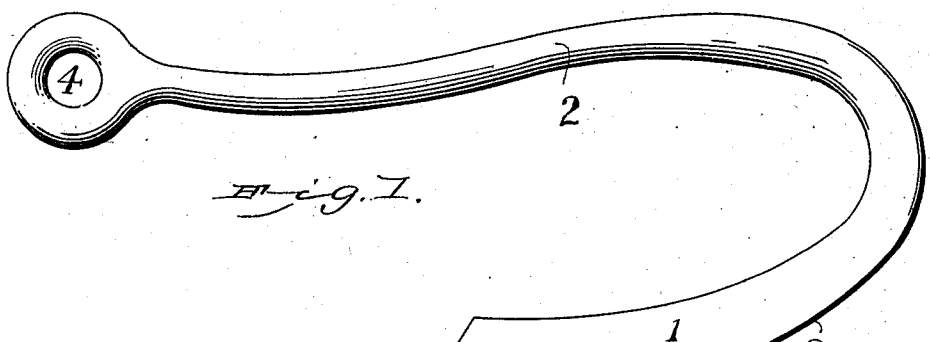
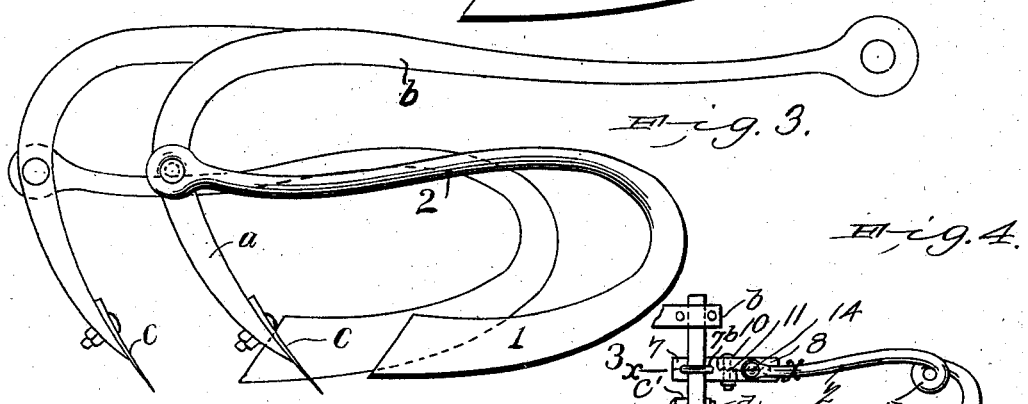
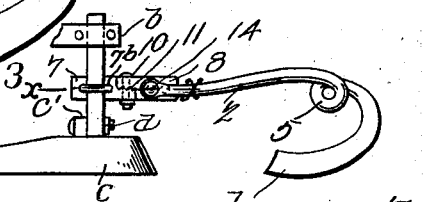
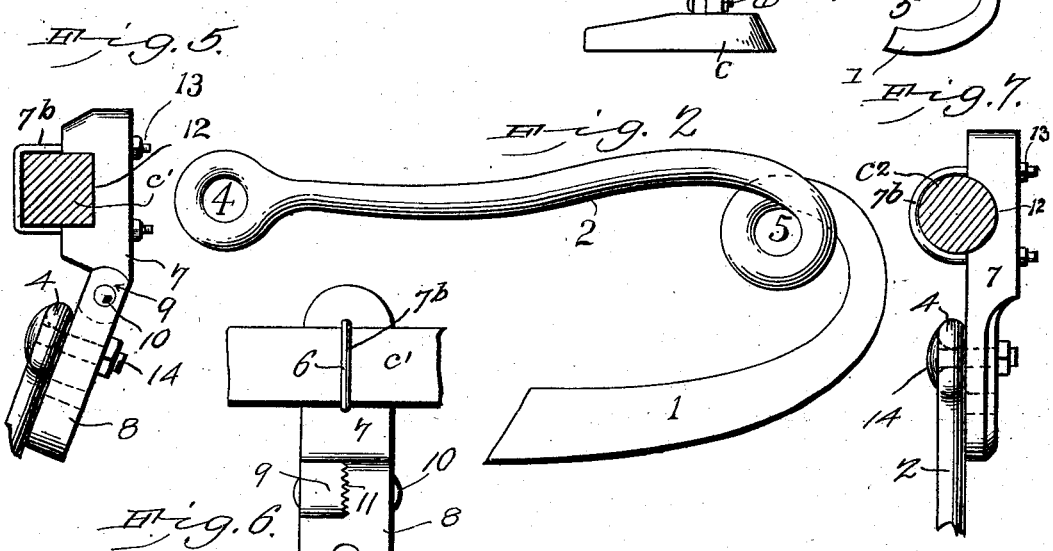
Witnesses W. Hoffert, Inventor.
by C. A. Snow & Co.
Attorneys

UNITED STATES PATENT OFFICE.

WILLIAM HOFFERT, OF ARLINGTON, ILLINOIS.

CULTIVATOR ATTACHMENT.

SPECIFICATION forming part of Letters Patent No. 718,350, dated January 13, 1903.

Application filed August 14, 1902. Serial No. 119,678. (No model.)

*To all whom it may concern:*

Be it known that I, WILLIAM HOFFERT, a citizen of the United States, residing at Arlington, in the county of Bureau and State of Illinois, have invented a new and useful Cultivator Attachment, of which the following is a specification.

My invention is an improved colter attachment adapted for use in connection with cultivators of various forms for cutting the stems and roots of morning-glories and other plants which may be growing between the rows in advance of the cultivator plows or shovels, so that the same will be buried under the soil and exterminated and so that the morning-glories or other weeds will be prevented from clogging the cultivator; and it consists in the peculiar construction and combination of devices hereinafter fully set forth and claimed.

In the accompanying drawings, Figure 1 is a side elevation of a colter attachment for cultivators embodying my improvements. Fig. 2 is a similar view showing a modification. Fig. 3 is a side elevation of one form of cultivator provided with colter attachments constructed in accordance with my invention. Fig. 4 is a similar view of a portion of a cultivator of another form provided with my improved colter attachment, showing the latter secured to the shank of the cultivator. Fig. 5 is a detail view of the same, partly in section, on the line $x\ x$ of Fig. 4. Fig. 6 is a detail view of the attaching device at right angles to Fig. 5. Fig. 7 is a detail view of another form of attaching device adapted for connecting my improved colter attachment to a cultivator having a round shank, the latter being shown in cross-section.

In the construction of my improved colter attachment I form the forwardly and upwardly curved blade 1 with a supporting-arm 2, which extends rearwardly from the front upper end thereof and is formed integrally therewith. The blade 1 has a cutting edge 3 on its lower side, and at the rear end of the arm 2 is an eye 4. Preferably the curved blade 1 and the rearwardly-extending arm 2 will be formed of steel; but the same may be made of iron or any other suitable material.

In the modified form of my invention shown in Fig. 2 the arm 2 is made of spring-steel and is formed with a spring-coil 5 near the point where the said arm merges into the blade 1, so that the latter when the attachment is in use on a cultivator may spring upwardly when it encounters a root, stone, or other obstruction and pass over the same without danger of becoming broken or of breaking the arm 2.

When my improved colter attachment is used in connection with that form of cultivator in which the standard $a$ is formed integrally with the beam $b$, as shown in Fig. 3, the eye 4 at the rear end of the arm 2 is firmly secured to the standard $a$ by a bolt 6. The arm 2 projects forwardly from the standard and is of such length that the colter-blade 1 is supported at a suitable distance in advance of the shovel $c$. Where the cultivator has a plurality of points or shovels, one of my improved attachments will be used in connection with and disposed to run in advance of each of them, as is indicated in Fig. 3. It will be understood that the colter-blades travel in advance of the shovels or points when the cultivator is in operation and cut the roots and stems of such morning-glories or other weeds or plants as may be growing between the rows, so that the same become buried and destroyed by the earth thrown on them by the tongues or shovels of the cultivator, and, moreover, by thus cutting the vines or plants the same are prevented from fouling and hanging upon the standards of the cultivator and interfering with the operation thereof.

To enable my colter atttachment to be used in connection with the kind of cultivator known as the "Tower" cultivator, wherein the blade or sweep $c$ is adjustably bolted to the lower end of a shank $c'$ by a bolt $d$, I provide the attaching device, consisting of a plate 7, secured by means of a clip $7^b$, which in the form thereof shown in Figs. 4, 5, and 6 is provided with a forwardly-extending arm 8, angularly adjustable with relation thereto. The meeting ends of the plate 7 and arm 8 overlap each other, as at 9, are pivotally connected together by a bolt 10, and are radially serrated on their opposing sides, as at 11, so that the arm 8 may be set and maintained at any desired adjustment, whether parallel or angularly, with reference to the plate. The latter is recessed on one side, as at 12, to receive the shank of the cultivator. If the shank is angular in cross-section, as shown in Figs. 4 and 5, the recess 12 is of corresponding form. A clip-bolt 13 embraces the shank and secures the recessed plate 7 detachably and adjustably to the shank, so that the colter attachment may be set to run at any desired distance from and ahead of the blade or sweep $c$. The colter attachment is secured to the adjustable arm 8 of the attaching device by a bolt 14. The arm 8 has a series of openings $8^a$ for said bolt. This admits of the longitudinal adjustment of the colter attachment and enables the same to be set to run at the desired distance ahead of the sweep or blade. Furthermore, since the arm 8 is laterally adjustable with reference to the yoke the same admits of the lateral adjustment of the colter attachment, as will be understood.

In Fig. 7 I show a modified construction of the attaching device, in which the same is a single piece and in which the recess 12 is segmental in form to receive one side of a cylindrical shank $c^2$. Other modifications may be made in the construction of the attaching device within the scope of the appended claims, and I do not, therefore, desire to limit myself in this particular.

Having thus described my invention, I claim—

1. A colter for cultivators, comprising a forwardly and upwardly curved blade having a cutting edge on its under side, and having a rearwardly-extending supporting-arm including a spring, said blade, arm and spring being formed integrally, substantially as described.

2. A colter for cultivators, comprising a forwardly and upwardly curved blade having its lower edge sharpened and having a rearwardly-extended arm forming the support therefor and provided with a pivotal eye at its rear end.

3. The combination with a cultivator, of a colter comprising a forwardly and upwardly curved blade having its lower edge sharpened and having a rearwardly-extended arm forming the support therefor, and means for pivotally connecting the rear end of said arm with the cultivator-standard.

In testimony that I claim the foregoing as my own I have hereto affixed my signature in the presence of two witnesses.

WILLIAM HOFFERT.

Witnesses:
   FRED. B. STEIN,
   OTTO WEISSENBURGER.